July 28, 1953

M. N. FAIRBANK 2,646,672

PHOTOFLASH GUN

Filed May 14, 1949

INVENTOR
Murry N. Fairbank
BY Donald L. Brown
and
Moncure B. Berg
Attorneys

July 28, 1953   M. N. FAIRBANK   2,646,672
PHOTOFLASH GUN
Filed May 14, 1949   4 Sheets-Sheet 2
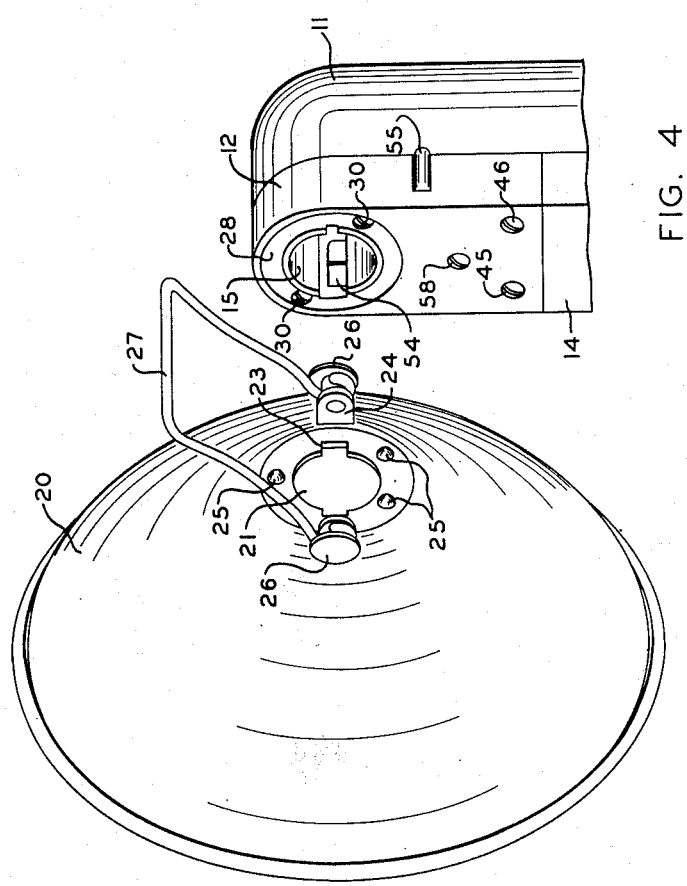
INVENTOR
Murry N. Fairbank
BY Donald L. Brown
and
Moncure B. Berg
Attorneys July 28, 1953 M. N. FAIRBANK 2,646,672
PHOTOFLASH GUN
Filed May 14, 1949 4 Sheets-Sheet 3
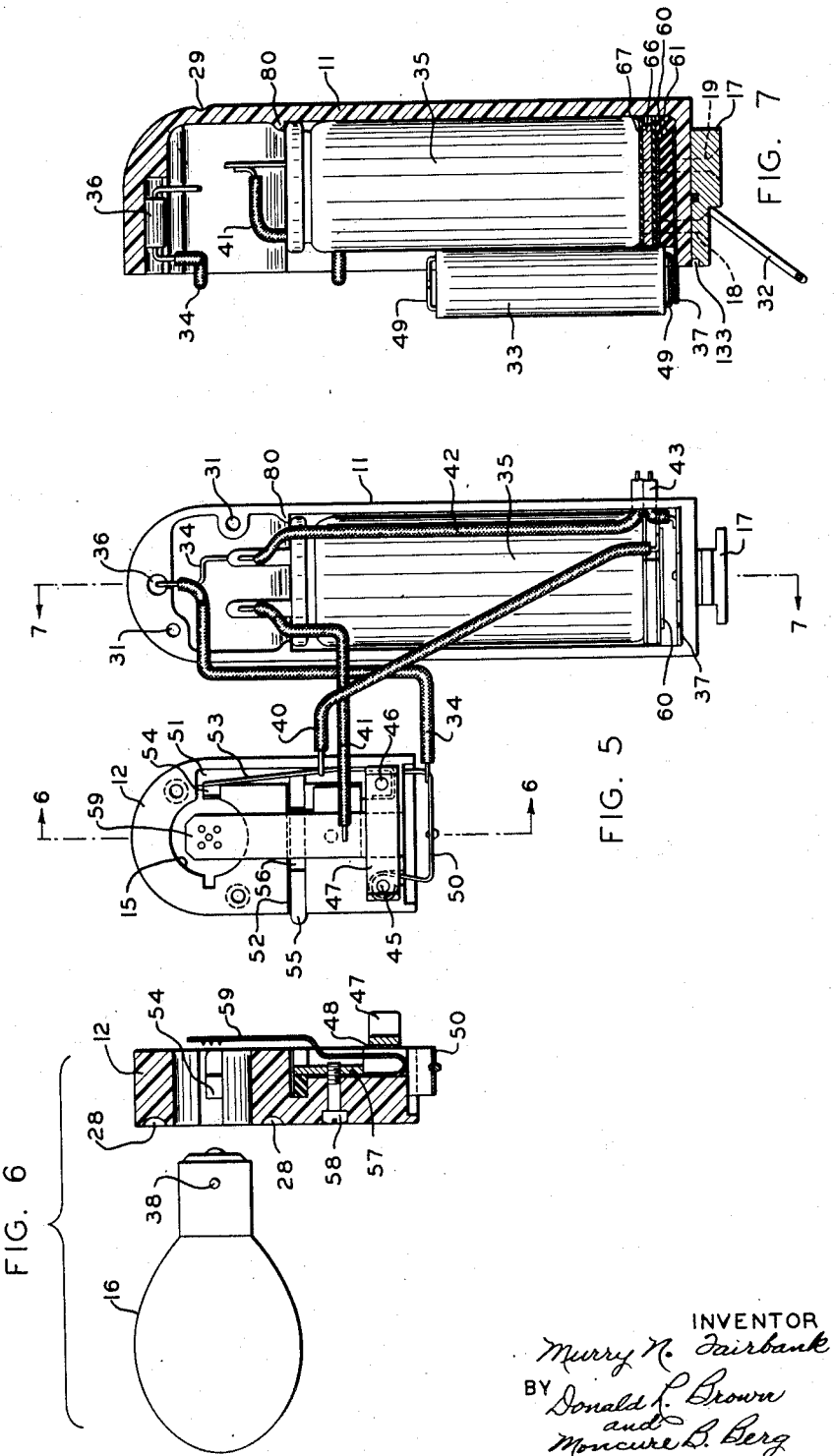
INVENTOR
Murry N. Fairbank
BY Donald L. Brown
and
Moncure B. Berg
Attorneys July 28, 1953  M. N. FAIRBANK  2,646,672
PHOTOFLASH GUN
Filed May 14, 1949  4 Sheets-Sheet 4
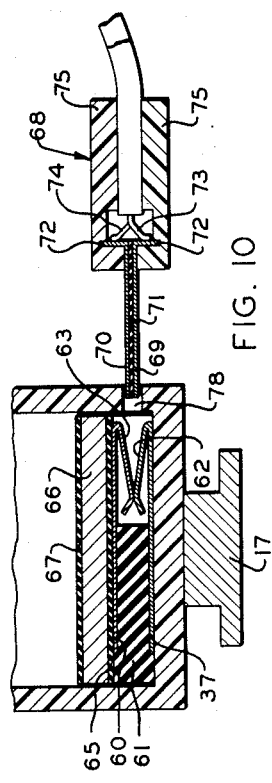
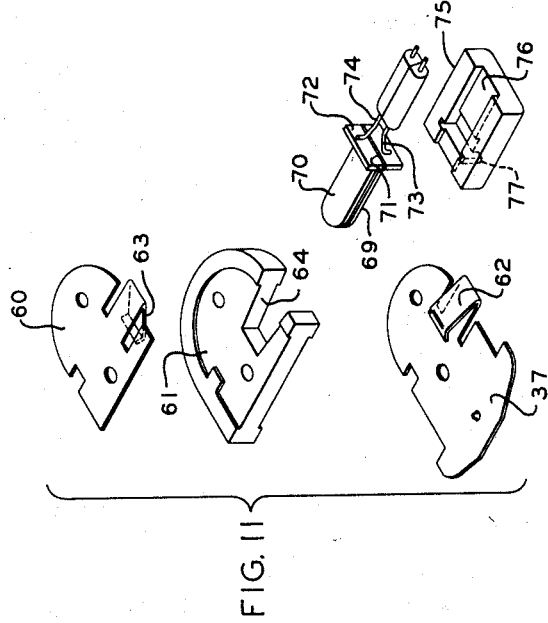
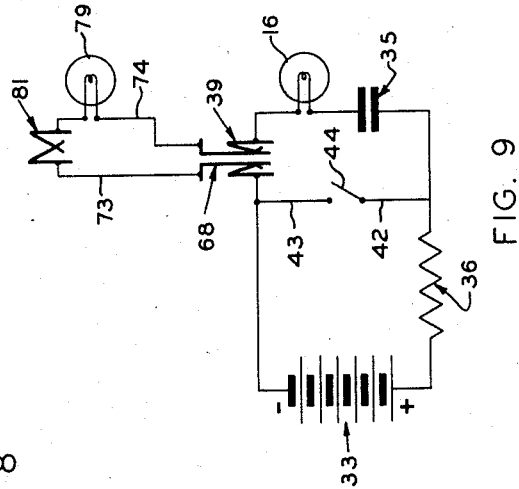
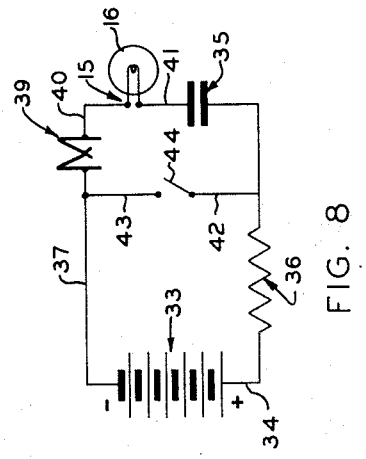
INVENTOR
Murry N. Fairbank
BY Donald L. Brown
and
Moncure B. Berg
Attorneys Patented July 28, 1953

2,646,672

UNITED STATES PATENT OFFICE 2,646,672

PHOTOFLASH GUN

Murry N. Fairbank, Belmont, Mass., assignor to Polaroid Corporation, Cambridge, Mass., a corporation of Delaware Application May 14, 1949, Serial No. 93,307

5 Claims. (Cl. 67—31)

This invention relates to flash guns or flash attachments for use in photography and more particularly has reference to a device of this character embodying a self-contained unit, including a battery as a source of energy, which is capable of being detachably mounted on camera apparatus and which carries means for permitting a plurality of flash bulbs to be connected to the unit for simultaneous flashing.

An object of the invention is to provide a flash gun having a casing adapted to be attached to a camera or manually holdable and provided with a readily removable reflector which is detachably secured to the casing in surrounding relation to a flash bulb by means of a resilient bail member pivoted to a reflector and embraceably engaging the casing.

Other objects of the invention reside in the provision of a flash gun having a casing provided with an open front portion which is closed with a socket-carrying member provided with a bulb socket and from which depends a battery contact support member, as well as to provide simple fastening means for operatively mounting bulb ejector mechanism and bulb-retaining or latch mechanism, and also a slide member for rendering the latch mechanism inactive in a socket-carrying member for a flash gun of the character described.

Further objects of the invention reside in the provision in a flash gun, having a casing adapted to house a battery for supplying energy to flash a bulb mounted in the socket of the flash gun, of a spring jack device formed of a pair of plates having normally contacting portions adapted to be spread apart by engagement with a connector plug employed to connect additional bulbs in circuit with the battery, and wherein one of the jack plates provides a battery support and contact for a pole of the battery; as well as in the provision in a flash gun, having a casing of the character described, wherein a battery support and contact member are secured to and depend from a socket-carrying member which is adapted to partly close the front portion of the casing, and wherein the depending battery contact member is utilized in conjunction with an extension portion on a jack plate to mount a battery therebetween and a cover member is employed to close the open front portion of the casing adjacent the battery mounting.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 3 is a view in perspective of the reflector associated with the flash gun;

Fig. 4 is a broken away perspective view of the casing of the flash gun with the reflector removed;

Fig. 5 is a front elevation of the flash gun casing with cover member removed and with the socket-carrying member detached therefrom and turned to show the back thereof in elevation;

Fig. 6 is an exploded view showing a bulb ready for insertion in the bulb socket and the socket-carrying member in section taken on the line 6—6 of Fig. 5;

Fig. 7 is a sectional view taken on the line 7—7 of Fig. 5 with the socket-carrying member and cover member removed from the casing;

Fig. 8 is a diagrammatic view of the electrical circuit used with the flash gun of Figs. 1 through 7;

Fig. 9 is a diagrammatic view of the electrical circuit of Fig. 8 showing an additional flash bulb connected in series therewith;

Fig. 10 is a broken away sectional view showing the mounting for the jack device in the bottom of the casing and a connector plug partially inserted within the casing; and Fig. 11 is an exploded perspective view showing parts of the jack device and the connector plug utilized in conjunction therewith.

Figure 2:
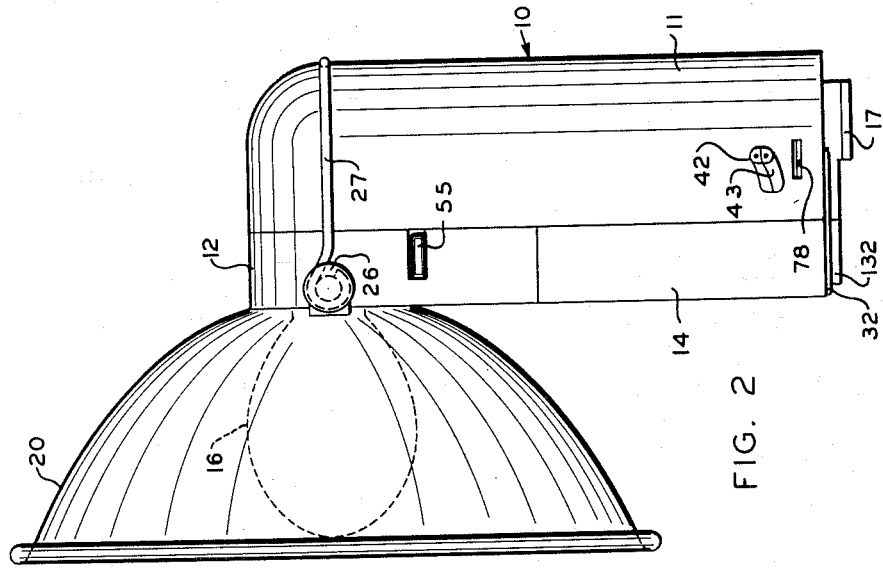
Fig. 2 is a side elevation of the flash gun shown in Figure 1.

The drawings disclose a flash attachment or gun, generally indicated by the reference numeral 10, comprising a casing or housing 11 having a top, a bottom, a back, two side portions and an open front portion which is adapted to be, at least partly, closed by a socket-carrying member 12 extending from the top towards the bottom of the casing. A removable cover member 14 is preferably employed in conjunction with the member 12 to close the lower front portion of the casing.

The socket member 12 has a socket 15 extending therethrough. Socket 15 is adapted to receivably engage a conventional photoflash bulb 16 of the expendable type which is indicated in dotted lines in Fig. 2 as engaged within the socket. Casing 10, socket member 12 and cover member 14 house and carry the wiring, accessories and parts needed to provide the electrical circuit disclosed in Fig. 8 for firing the bulb 16. An attachment slide 17 is secured by means of screws 18 and 19 to the bottom or base of casing 11. Slide 17 is adapted to be detachably engaged with a suitable guide on the camera apparatus with which the flash gun 10 is employed.

The housing 11, socket member 12 and cover member 14 may be formed of any suitable electrical nonconductor or insulating material, such as micarta, phenolic or other resins and plastic materials, including vulcanized rubber.

Associated with the housing is a reflector 20 which as shown is ellipsoidal and provided with a flattened portion 23 adjacent its vertex. This flattened portion, which is not essential, facilitates manufacturing of the reflector. Other geometrical shapes, for example, spherical or parabolic or the like, may be given to the reflector which may be made of metal or other conventional material and which may have its inner surface suitably polished or reflecting. Reflector 20 is provided with a central opening 21 to permit flash bulb 16 to extend therethrough and to be engaged within the socket of the member 12.

The bulb 16 has a cylindrical unthreaded base and is provided (see Fig. 6) with a pair of pins 38 which project outwardly from the base at right angles to the longitudinal axis of the bulb and are located at diametrically opposed positions. These pins are utilized for securing the bulb within the socket 15 of the socket member 12. The usual contact is formed at the end of the bulb base.

Figure 1:
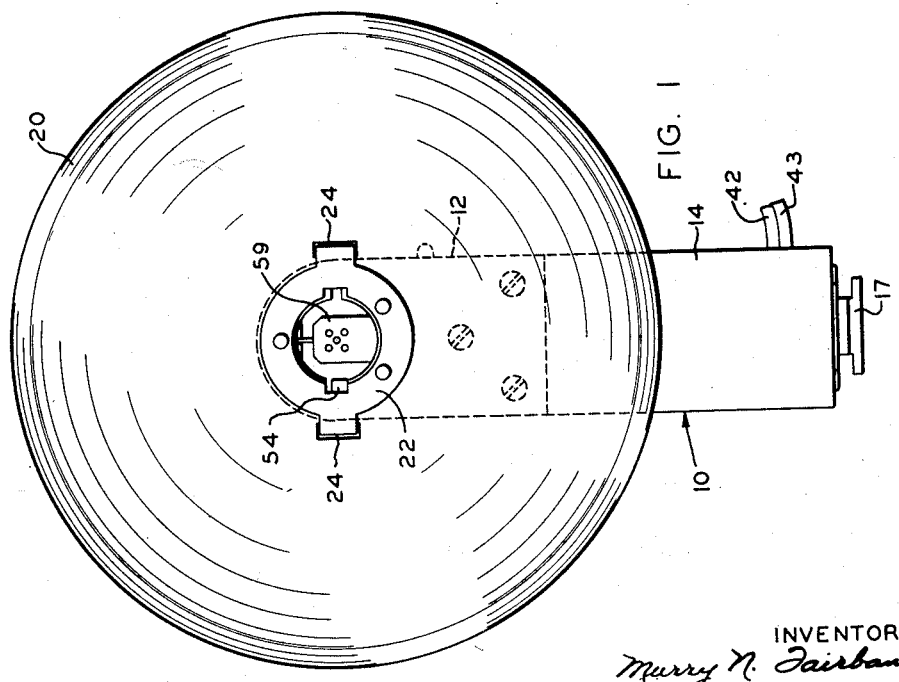
Figure 1 is a front elevation of the flash gun of this invention showing the casing with reflector attached thereto.

To secure the reflector to the housing 11, use is made of an annular yoke 22 of metal which is particularly well shown in Figs. 1 and 2 and which is adapted to be fixed to the reflector 20. The opening in yoke 22 is of a size suitable to receive the base of the flash bulb 16 and is provided with slots adapted to cooperate with similar slots in the central opening 21 in the reflector 20 to permit the flash bulb base to extend through the yoke and the reflector with the guide or centering pins 38 on the bulb base in alignment with these slots. Yoke 22 is located on the inside or reflecting side of the reflector 21 and is shaped to seat firmly on the reflector surface. Overturned extensions, which form ears 24, are provided on the yoke and these extend through openings in the reflector, as particularly well shown in Fig. 3. Rivets 25, extending through the reflector and the yoke, secure these two elements together. Studs 26 are fixed to each ear 24, as it is also particularly well shown in Fig. 3, and have the ends of a clamp 27 pivotably engaged thereto.

As may be observed in Fig. 2, the reflector 20 is adapted to be held in bearing contact with the front or exposed face of the socket member 12 which has a channel 28 formed in the front face thereof in surrounding relation to the bulb socket 15. The reflector 20 is positioned in contact with the face of the member 12 so that the heads of rivets 25 are seated within the channel 28 and the clamp member 27 is swung in a clockwise direction, as viewed in Fig. 2, partially around the casing and into engagement with a depressed portion 29 in the back of the casing.

Clamp 27, which is resilient, is so proportioned that when it is engaged within the depression 29 with the reflector in operating position, the reflector 20 will be securely locked or fixed to the casing 11 and socket member 12. Reflector 20 is removed from operating position by simply raising or pushing clamp 27 out of the depressed portion 29 and swinging the clamp in a counterclockwise direction, as viewed in Fig. 2. The upper portion of the casing adjacent the top, sides and back thereof is given a rounded contour. This rounding off of the casing facilitates engagement and disengagement of the bail-like clamp means 27 with the casing.

As may be observed, the rivets 25 are in effect spaced-apart lug members which, in conjunction with the use of a channel adapted to surround the socket member, assure quick and simple indexing of the reflector with the socket-carrying member 12 whereby the bulb opening in the reflector is registered with the socket opening. Of course, if desired, other constructions may be employed. For example the channel 28 could be formed on the reflector and lugs placed around the socket in the member 12. Furthermore, an annular ridge could be employed in place of lugs in any lug type mounting construction. Similarly, holes could be placed within the socket adapted to receive pins fixed on the reflector and engageable with these holes.

The socket member 12 and the cover member 14, which are both of a width similar to that of the casing, are removably secured to the casing 11 and are also of similar thickness whereby their outer surfaces may lie substantially in a plane which is at right angles to the bottom or base of the housing 11 when these members are attached to the housing. Member 12 is molded with suitable channels and recesses adapted to carry various elements to be hereinafter described and is secured to the casing 11 by screws 30 which engage threaded holes 31 in the side walls of the casing. As may be noted in Fig. 5, the lower portion of the socket member 12 is formed with one half of a lap joint which is adapted to engage with the other half of a lap joint formed on the upper end of the cover member 14.

Cover member 14 is hollow and has one open end at which the other half of the just-mentioned lap joint is formed. The cover member 14 is merely seated on the open portion of the casing 11 with its part of the lap joint engaged with the lower end of the socket member 12, and is secured in operative position by means of a resilient clamp 32 or bail pivoted to the attachment slide 17 and engaged over a plate or projection 132 fixed to the end of the cover member 14. To facilitate mounting, a tongue, formed at the lower end of the cover member 14, is adapted to engage within a recess 133 formed between the attachment slide 17 and the bottom of the casing 11. These arrangements are shown in Figs. 2 and 7.

While the use of a cover member 14, in conjunction with the socket-carrying member 12, is preferred, it is possible to construct this socket-carrying member of a length sufficient to fully cover the open front portion of the casing 11 and to hollow out the lower half of this member.

As previously pointed out, the casing 11 and socket member 12 are adapted to house and carry wiring, accessories and parts needed to provide the electrical circuit diclosed in Fig. 8. This circuit comprises a battery 33, the positive terminal of which is connected by a lead 34 through resistance 36 to the positive plate of a condenser 35. The negative side of the battery is connected by a lead in the form of a plate 37 to one side of a jack generally indicated by the reference numeral 39. The other side of the jack is connected by lead 40 to one contact for the bulb socket 15 while the other contact for the bulb socket 15 is connected by a lead 41 to the negative plate of the condenser 35. It will thus be noted that the jack 39, bulb socket 15, condenser 35 and resistance 36 are connected in series. Leads 42 and 43 are connected across the circuit with the lead 42 located between the resistance 36 and the condenser and the lead 43 located between the battery and the jack 39, and are in turn connected to a synchronizing switch 44 which is actuated upon the operation of the shutter of the camera.

As may be observed, the circuit shown in Fig. 8 is open until the flash bulb 16 is inserted in the circuit which causes battery 33 to charge the plates of the condenser 35. Discharge of the condenser and firing of the bulb 16 will occur on closing of the switch mechanism 44. It is to be noted that the wiring, shown in Figs. 5 and 7, is designated by the same reference numerals as employed in Fig. 8 to designate the different parts of the circuit.

The manner in which the various parts of the device are mounted within and carried by the casing 11 and the socket member 12 is detailed in Figs. 5, 6 and 7. As shown, the condenser 35 is loosely fitted within the casing 11 and is retained therein by partial closing of the casing by the socket member 12 and by a rim or lugs 80 formed on the interior of the casing 11. The condenser 35 is spaced from the base of the casing 11 and is supported on insulation in contact with a metal jack-retaining plate to be later described. A spring plate 37 is supported upon the base of the casing 11 and is secured thereto in a manner which will presently become apparent. This plate 37, which is of metal and an electric conductor, extends beyond the casing, as illustrated in Fig. 7, and forms a lower contact and support for the battery 33. The upper battery contact 50 is carried by and fixed to the socket member 12.

As may be noted in Figs. 4 and 5, screws 45 and 46 extend through the front of the socket member 12 and secure a spacer bar 47 to the back of the socket member 12. A suitable strip of insulation 48 is located between the spacer bar 47 and the back of the socket member 12. The ends of spacer bar 47 are turned over and when the support member 12 is mounted on the casing these turned-over ends engage the inner wall of the casing and properly align the support member with the casing.

Screw 45 extends through a recess, as shown in Fig. 5, formed in the rear surface of the socket member 12. This expedient permits the upper battery contact member 50 to be carried by the socket member. For this reason the contact member 50 is formed of a resilient metallic strip and is provided with overturned ends, one of which is bent partially around itself and is adapted to be engaged within the recess adjacent the screw 45 and to have this screw extend therethrough without contact. Contact member 50 is retained in its mounting by reason of its snug engagement with the recess around the screw 45 and by the extension over this recess of the spacer bar 47. The other end of the contact 50 is straight and bears against an end portion of the socket member. Battery 33, which is a conventional hearing aid battery with terminal contacts 49 of the type illustrated, is mounted between the contacts 50 and 37 of the flash gun and is firmly held therebetween in pressure engagement. Contact 50 is of course formed of conducting material.

As illustrated in Fig. 5, lead 34 is connected to the contact 50 by soldering or the like and similarly to a conventional resistance unit indicated at 36 as fitting within a bore formed at the upper end of the housing 11 and particularly well shown in Figs. 5 and 7. The other end of the resistance unit 36 is connected to the contact for one of the condenser plates and this lead is also connected by lead wire 42 which extends partially through the casing 11 and passes through an opening in a side of the casing, as shown in Figs. 1, 2 and 5.

With reference to Fig. 5, it may be observed that a longitudinally extending channel 51 is formed in the back of the socket member 12 adjacent one side thereof and that this channel is joined by a transversely positioned channel 52 which extends through the side of the socket member most distant from channel 51. At its lower end, the longitudinal channel 51 opens into a recess formed around screw 46 while a right angle bend, provided at its upper end, permits channel 51 to open into the socket 15. A flash bulb-retaining member or latch 53, which has an elongated body and which is capable of spring action, is mounted and retained in channel 51. The lower end of the bulb-retaining member 53 is partially bent over on itself and is engaged snugly in the recess around screw 46 without contact of said screw. Member 53 is retained from rising out of the recess by spacer bar 47 and insulater strip 48.

The upper end of latch 53 is provided with a V-shaped head which is movable within the portion of the channel 51 that opens into socket 15. The V-shaped head 54 is formed by providing the upper end of the bulb-retaining member 53 with a portion which extends transversely of the elongated body of this member and which in part forms one leg of the V and is turned over on itself to form the second leg of the V. This permits the bulb-retaining member 53 to be mounted in the channel 51 so that the apex of the V formed by the head 54 points towards the front face of the socket member 12.

The body of the bulb-retaining member 53 is sufficiently resilient and appropriately bent to constantly urge the head 54 into the socket 15 and normally cause the head to project slightly within the socket to contact the base of a bulb 16 inserted in the socket. Because of this, a guide or centering pin 38 on the base of a conventional bulb 16, being inserted in the socket, will force the head 54 into the channel 51 until the pin has cleared the head, which then springs into its normal position. When this occurs, the bulb is fully seated in the socket 15 and the head 54 is located between said pin and the face of the socket member 12 whereby the bulb 16 is securely locked in the socket. It may be noted that the V-shaped head 54 serves the dual function of locking the bulb in its socket and providing electric contact with the bulb base. For this reason a wire lead 40, as shown in Fig. 5, connects the retaining and contact member 53 to the jack device utilized by the invention.

Movement of the retaining member 53 out of engaging position is effected by means of a push button or slide 55 which is slidably mounted in the transverse recess 52 in the back of the socket member 12. This slide is made of nonconducting material of the character described and is provided with a centrally located slot or notch 56 in the back edge thereof, i. e., the edge most removed from the front face of the socket member.

Slide 55 is held in the channel 52 by a retainer plate 57 which engages in notch 56 and which is mounted in a recess in the back of the socket member 12 and is secured thereto by screw 58 which extends through the socket member from the front thereof, as shown in Fig. 6. The retainer plate 57, where it engages the notch in the slide 55, is narrower than the notch whereby limited sliding freedom is provided for the slide while retaining the button in its channel 52. Slide 55 is sufficiently long to normally bear against the bulb-retaining member 53 so that finger pressure applied to the end of the slide, which extends outside of the socket member 12, will operate the slide and cause the member 53 to be moved to clear the head 54 from the socket 15. Member 53 is sufficiently resilient to return the slide 55 to its normal position upon release of operating pressure on the slide.

The second contact of the bulb 16 is provided by a relatively wide spring member 59 which is sufficiently resilient to serve as an ejector in the removal of a flash bulb from the socket 15. Any suitable spring metal which is an electric conductor may be used for the formation of the spring ejector 59. As may be noted especially well in Fig. 6, the lower end of the spring member 59 is provided with a U-shaped portion which has one leg thereof engaged between the retaining plate 57 and the base of the recess in which the spring member and plate 57 are seated. Screw 58 extends through the portion of the member 59 which is engaged by the plate 57. A bend in the part of the spring member 59, which extends above the other leg of the U-shaped portion thereof, permits the spring member 59 to extend outwardly and to the rear of the socket member 12 to a position opposite the socket 15 in this member.

When a flash bulb 16 is seated within the socket 15, the contact at the end of the base of the bulb is adapted to bear against the upper end of the spring member 59, as viewed in Figs. 5 and 6, and to push the spring away from the socket member. When the slide 55 is pressed to free the head 54 of the retainer member 53 from contact with the base of a bulb inserted in the socket 15, the spring 59 will force the bulb outwardly at least by a distance sufficient for a pin 30 on the bulb base to be freed from locking action by the head 54 of the member 53. As shown in Fig. 6, a wire lead 41 is soldered to the spring member 59 and to one plate of the condenser 35.

An important feature of the invention resides in the provision of a circuit having means therein for adding one or more flash bulbs thereto in addition to that carried by the flash gun 10. A jack device mounted in the base of the casing 11, below the condenser, is utilized for effecting this feature. This jack device is particularly well shown in Figs. 10 and 11 and comprises the plate 37 and an upper resilient jack plate 60 spaced from the plate 37 by the use of a spacer plate 61 formed of nonconducting material of the character described. Plate 37, in addition to functioning as a battery support and battery contact, also serves as a lower jack plate.

As may be observed, the plate 37 is provided with a bent-over tongue 62 which is angularly inclined to the face of the upper surface of the plate. Plate 37 is so shaped that a portion thereof on each side of the projecting tongue 62 is cut away, whereby resiliency of the tongue is increased. Plate 60 is provided with a similar tongue 63 which, however, is arranged so that it is inclined to the lower face of said plate whereby its direction is opposed to that of the tongue 62. The spacer 61 is provided with a notch 64 so that when the plate 60 and plate 37 are assembled in contact with the opposite sides of the spacer 61, the tongues 62 and 63 will be received in said notch and will be normally in contact with each other, as shown in Fig. 10. A projection on each side of spacer 61, at a location opposite the notch 64, cooperates with a cutaway portion in each plate 37 and 60 and centers the plates 37 and 60 in contact with the respective faces of the spacer.

The jack device just described is mounted in the casing so that the plate 37 seats on the inner surface of the casing base. A layer of insulating material 65 is supported on the upper surface of the top jack member 60 and this in turn supports a metal retaining plate 66, as particularly well shown in Fig. 10. Screws 18 and 19, which secure the attachment slide 17 to the base of the housing 11, are adapted to extend through the plate 37, spacer 61, upper jack plate 60, insulating layer 65 and into the retainer plate 66 which is provided with threaded holes for the reception of these screws. Holes in plates 37 and 60 are large enough to prevent contact with screws 18 and 19. A layer of insulating material 67 is provided over the upper surface of the retainer plate 66 and it is on this layer 67 that the condenser 35 is seated.

As previously noted, the bottom plate for the jack device is of a relatively elongated character and is so constructed as to provide the lower battery support. This battery support portion of plate 37 is shown as an extension which is located towards the front of the plate, as illustrated in Fig. 11.

The lower end of the lead wire 40 is soldered to the upper jack plate 60 and a wire 43 is soldered to the lower plate 37 of the jack device and is taken through the opening in the side of the casing along with the lead wire 42. The free ends of the wires 42 and 43 are connected to a conventional electric plug (not shown) which is adapted to be engaged with a suitable socket on the camera with which the flash gun 10 is associated. The socket on the camera is of conventional construction and is suitably connected with the switch mechanism actuated upon operation of the camera shutter.

In employing the jack device 39 use is made of a special plug generally indicated by the reference numeral 68 and particularly well shown in Figs. 10 and 11. Plug 68 comprises two metal contact plates or strips 69 and 70 which are heat sealed to the opposite sides of a bonding film or tape 71 of a character which is a nonconductor of electricity. Contacts 69 and 70 are each respectively provided at one end with a flange 72 which projects at right angles to the length of the plate and which is wider than the plate so it extends symmetrically over the edge of each contact plate at the rear thereof. The subassembly of the contact 69 and 70 thus has a T-shaped appearance. Flanges 72 have the ends of wire conductors 73 and 74 secured thereto as by soldering. These wires, if desired, may be encased within a suitable sheath such as shown in Fig. 10.

As intimated previously, the layer of insulating material 71 is formed of a bonding film to which the contact plates of the plug 68 may be heat sealed. An example of this film, which comes in the form of a tape, is that known as Scotchweld Bonding Film #580 sold by the Minnesota Mining and Manufacturing Company. A film of this type, having a thickness of 0.008 inch, has been successfully used. A liquid capable of forming a similar insulating bond is that known as "Cycle-Weld" which is produced and sold by the Chrysler Corporation. Of course any other type of insulation, for example a thin strip of plastic or rubber, may be employed with suitable adhesives. Contact plates 69 and 70 are relatively thin and are shown in the drawings as having a thickness of about twice that which is normally employed.

Contacts 69 and 70, when in assembled condition, are adapted to be carried in a finger grip or handle formed of two similar members 75, one of which is detailed in Fig. 11. As shown in Fig. 11, a longitudinally extending channel 76 is formed in one face of each member 75. Channel 76 has a deeply depressed portion 77 intermediate of its ends within which a flange of a plate 69 or 70 is adapted to be seated. As these flanges are wider than the deep depression forming the seat 77, transversely positioned recesses are formed in the side walls of each member 75 to receive the edges of the flange. The channel 76, on one side of the seat portion 77, provides a support for conductors 73 and 74 while contact plates 69 or 70 are supported in the portion of the channel 76 on the other side of the seat 77 and extend outwardly from the handle member.

Each finger grip member 75 is made of a suitable plastic. In assembling the plug, the already assembled contact plates 69 and 70 are mounted in one of the finger grip members 75 in the manner described. A second finger grip member 75 is then placed over the partially assembled plug and is cemented thereto by a suitable adhesive with heat and pressure if needed. Fig. 10 shows the plug partially inserted in the casing 11 through a hole 78 therein aligned with the contacting tongues of the jack members. As the plug is inserted it separates and engages the tongues of the jack members and is frictionally held therein.

Other finger grip means may be employed in lieu of those disclosed. For example, the finger grip may be provided by molding a synthetic plastic or rubber, or the like, in place around the assembled contact members 69 and 70 and wires 73 and 74 connected thereto.

Fig. 9 schematically illustrates the wiring diagram for the flash gun when a second photoflash bulb is employed and shows a plug 68 engaged with the jack device 39, the leads 73 and 74 from the contact members thereof being connected to the opposite sides of a suitable lamp socket having a photoflash bulb 79 engaged therein. On closing of the shutter switch mechanism 44 and discharge of the condenser 35 both of the lamps 16 and 79 are fired. It is to be noted that lamp 79 is in series with the lamp 16. One or more additional photoflash lamps or bulbs may be connected within the auxiliary circuit so that all lamps are connected in series. This is preferably accomplished by including a jack device, similar to jack 39, in each of the lamp sockets intended for use in the auxiliary circuit so that each lamp of the auxiliary circuit may be connected in series with the main circuit of battery 33, lamp 16, condenser 35 and shutter switch 44. A jack device 81, suitable for this purpose, is shown in the auxiliary circuit in Fig. 9.

The battery 33, used with the flash attachment, is a conventional small 22½ volt B battery, preferably a hearing aid battery of this voltage. The condenser employed is of the electrolytic type and has a capacity of 100 microfarads. A resistance of 2500 ohms has been used successfully in the illustrated circuits. This resistance is desirable to control charging rate of the condenser when the flash bulb is inserted in its socket. The switch 44, which does not form a part of this invention, may be any switch mechanism operated by the camera shutter to close the discharge circuit at a time appropriate to synchronizing flash and exposure.

As may be observed, the condenser 35 is connected to the battery when a lamp 16 is inserted in the lamp socket. Charging current then flows through the lamp filament and brings the condenser voltage up to 22½ volts within several seconds or less. Use of the lamp to close the condenser charging circuit has the advantage of eliminating a special switch mechanism for this purpose. It has been found that an unused bulb may be allowed to remain in the socket for about eight hours without seriously discharging the battery. Obviously, when no bulb is in the socket or a burnt out bulb is in the socket, the condenser will not be charged and there will be no drain on the battery.

The electrical system disclosed has the advantage of operating upon battery voltage and not battery current and permits the effects of the internal resistance of the battery to be neglected. Furthermore, the efficiency of this system is substantially constant up to the shelf life of the battery. 22½ volt batteries of the character described, up to a year old, have successfully fired four #5 photoflash lamps in series.

It has been found that a 100 microfarad condenser, charged to 22½ volts, will successfully fire as many as four lamps when the lamps are connected in series. Series operation permits synchronized firing of the lamps within the limits of lamp tolerance. When lamps are connected in parallel, this degree of synchronism is lacking since the lamps nearest the supply source will frequently fire before those lamps further removed therefrom.

It is to be observed that the flash gun of this invention comprises a self-contained unit which is capable not only of being detachably mounted upon a camera but may be held by hand or may be secured to a mount separated from the camera. This is made possible by a compact and lightweight design which also features means for permitting a plurality of flash bulbs to be connected at will within the electrical circuit utilized with the flash attachment.

Since certain changes may be made in the above product without departing from the scope of the invention herein involved, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a flash gun device having a casing provided with a socket adapted to receive a flash bulb and a battery carried by the casing for supplying energy to an electrical circuit including a bulb mounted in said socket, in combination, jack means connected in said circuit and carried by said casing for permitting at least one other bulb to be included in the circuit, said jack means comprising a pair of plates carried in said casing and mounted in spaced-apart relation adjacent the bottom of said casing with each plate connected in said circuit, said plates having portions thereon normally in contact with each other but adapted to be spread apart and engaged with connector plug means when inserted therebetween for connecting an additional bulb in said circuit, said casing being provided with an opening aligned with said contacting portions of said jack plates and adapted to removably receive plug means therein for insertion between said contacting portions of said jack plates, and battery-supporting means provided on one of said jack plates in the form of an extension which provides a seat for said battery and a contact for one pole thereof.

2. The combination, in a flash gun for use with a camera, of a casing having an open front portion, a socket-carrying member provided with a bulb socket opening therethrough secured to the front of the casing and closing a part thereof, a cover member detachably engaged with said casing and said socket-carrying member and closing the remainder of the front portion of the casing, a battery for supplying energy to an electrical circuit including a bulb adapted to be engaged within said socket, jack means connected in said circuit and carried by said casing for permitting at least one other bulb to be included in said circuit, said jack means comprising a pair of plates carried in said casing and mounted in spaced-apart relation adjacent the bottom of said casing with each plate connected in said circuit, said plates having portions thereon normally in contact with each other but adapted to be spread apart and engaged with connector plug means when inserted therebetween for connecting at least one other bulb in said circuit, said casing being provided with an opening aligned with said contacting portions of said jack plates and adapted to removably receive plug means therein for insertion between said contacting portions of said jack plates, a battery support and contact member depending from said socket-carrying member, and a second battery support and contact member formed by an extension portion on one of said jack plates, said battery being supported between said opposed contact members with the poles of said battery each frictionally engaged therebetween.

3. The combination in a flash gun as defined in claim 2, wherein a condenser which is connected in circuit with said battery is mounted within said casing and is retained therein by said socket-carrying member, and wherein one battery support and contact comprises a resilient metallic stirrup which is secured to said socket-carrying member in depending relation thereto, said battery being engaged between said stirrup and the extension portion of said jack member and said cover member extending over said battery and enclosing it within said casing.

4. In a flash gun for use with a camera, a casing, said casing comprising socket-carrying means having a front surface and a back surface and being provided with a bulb-receiving socket extending therethrough from the front through the back surfaces thereof, first spring means seated within the back of said socket-carrying means for retaining a bulb against removal from said socket, manual means for rendering said first spring means inactive, second spring means mounted on said socket-carrying means for ejecting a bulb from said socket when said first spring means is rendered inactive, said first and second spring means being electrical conductors and being adapted to contact electrical terminals on the base of a bulb retained in said socket, and an electrical circuit including a battery carried by said casing for supplying energy to said electrical circuit, a condenser mounted within said casing, one of said first and second spring means being electrically connected to one of the plates of said condenser, the other of the plates of said condenser being electrically connected through a resistance to one of the terminals of said battery, said resistance being mounted within said casing, the other one of said first and second spring means being electrically connected to the other of the terminals of said battery, a lead electrically connected to said other one of the plates of said condenser and extending out of said casing, another lead electrically connected to said first spring means and extending out of said casing, said leads being adapted to be electrically connected by means of a switch which is synchronized with the shutter of said camera.

5. In a flash gun for use with a camera, a socket for receiving a flash bulb, first means operative to retain said bulb within said socket, second means for rendering said first means inoperative, and third means for ejecting said bulb from said socket when said first means is rendered inoperative, said first and third means being electrical conductors and being adapted to contact electrical terminals on the base of said bulb, and an electrical circuit including a battery for supplying energy to said electrical circuit, a condenser, one of said first and third means being electrically connected to one of the plates of said condenser, the other of the plates of said condenser being electrically connected through a resistance to one of the terminals of said battery, the other of said first and third means being electrically connected to the other of the terminals of said battery, a lead electrically connected to said other of the plates of said condenser and another lead electrically connected to said other of said first and third means, said leads being adapted to be electrically connected by means of a switch which is synchronized with the shutter of said camera.

MURRY N. FAIRBANK.

References Cited in the file of this patent
UNITED STATES PATENTS

| Number | Name | Date |
|---|---|---|
| 1,949,008 | Cole | Feb. 27, 1934 |
| 2,170,529 | Hoffman | Aug. 22, 1939 |
| 2,200,458 | Steiner | May 14, 1940 |
| 2,302,031 | Jacobson | Nov. 17, 1942 |
| 2,310,165 | Steiner | Feb. 2, 1943 |
| 2,343,552 | Hollister et al. | Mar. 7, 1944 |
| 2,384,327 | Mendelsohn | Sept. 4, 1945 |
| 2,395,600 | Weisglass | Feb. 26, 1946 |
| 2,406,725 | Weaver | Aug. 27, 1946 |
| 2,421,057 | Dunkelberger | May 27, 1947 |
| 2,477,895 | Pollock | Aug. 2, 1949 |
| 2,584,858 | Fritz | Feb. 5, 1952 |